United States Patent [19]
Arregui

[11] 3,964,626
[45] June 22, 1976

[54] TRUCK FOR HANDLING CONTAINERS
[75] Inventor: Jose Luis Loidi Arregui, Bilbao, Spain
[73] Assignee: Asteko S/A, Bilbao, Spain
[22] Filed: Nov. 8, 1974
[21] Appl. No.: 522,089

Related U.S. Application Data
[63] Continuation of Ser. No. 321,276, Jan. 5, 1973, abandoned.

[30] Foreign Application Priority Data
Jan. 8, 1972   Spain .......................... 175995[U]
Apr. 26, 1972  Spain........................... 179781[U]

[52] U.S. Cl.................................. 214/505; 214/517
[51] Int. Cl.² ............................................. B60P 1/28
[58] Field of Search .......... 214/505, 506, 516, 517, 214/38 D, 85, 85.1, 83.24

[56] References Cited
UNITED STATES PATENTS
| | | | |
|---|---|---|---|
| 2,580,501 | 1/1952 | Anderson et al. | 214/517 |
| 2,703,658 | 3/1955 | Bazzell | 214/505 |
| 3,049,378 | 8/1962 | Nelson | 214/517 X |
| 3,467,268 | 9/1969 | Corompt | 214/505 |
| 3,712,491 | 1/1973 | Kreutzer | 214/517 |

FOREIGN PATENTS OR APPLICATIONS
1,553,568   12/1968   France ......................... 214/505

*Primary Examiner*—Albert J. Makay
*Attorney, Agent, or Firm*—Eyre, Mann, Lucas & Just

[57] ABSTRACT

A vehicle mounted apparatus for loading and unloading containers onto and from the vehicle is disclosed. The apparatus comprises a tilting frame mounted on the vehicle having a plurality of longitudinal beams and a single fluid piston and cylinder arrangement for tilting the frame. The single fluid cylinder and piston are disposed longitudinally on the frame and have at least one pulley mounted on the piston and at least one pulley mounted on the cylinder. The single cylinder and piston arrangement further comprises a first guide associated with the piston and the beams for guiding the piston during its extension and a second guide associated with the container and the beams to guide the container as it is rolled onto the tilting frame. The frame also comprises a retractable extension having beveled end portions with wheels mounted thereon to permit the extension to roll on the ground surface when the frame is tilted.

3 Claims, 6 Drawing Figures

TRUCK FOR HANDLING CONTAINERS

This is a continuation of application Ser. No. 321,276, filed 1/5/73, now abandoned.

Our device is designed for a greater and better manipulation of containers when they are loaded into a truck.

For this end, in the chassis of the truck there is a tilting frame equipped at its rear part with an extension which is insertable into said frame and ends in a beveled edge with wheels so that with said extension aligned with the frame and said frame tilted, the wheels of the beveled edge make contact with the ground.

In the tilting frame there is a hydropneumatic cylinder arranged longitudinally, which at the end of the piston rod has a crosshead with a fork at each of its ends which when inserted in guide plates integral with the longitudinal beams of the frame improved the travel of the rod by keeping it from wobbling over its extension. Likewise, at the end of the hydropneumatic cylinder and at the end of the piston, there is a set of pulleys through which the haulage line of the container passes ending in a hook for anchoring in said container during the time it is dragged.

The container is equipped with some wheels in its rear part and in the front part it has some of lesser diameter. On its sides and longitudinally it has some flanges which serve to place the guides of the container on the longitudinal beams of the frame when there exists a certain deviation at the moment the container is loaded.

The container is loaded when the piston of the hydropneumatic cylinder extends with which the haulage line or chain is pulled and therefore the container which is hooked to same and which slides by means of its fore-wheels on the longitudinal beams of the frame while the rear wheels make the container slide along the ground until all of it is on the frame.

When a container is dealt with, (wheel-less type), it is previously connected to a platform equipped with lower grooves, wheels and side projections and the loading is performed in a way similar to the way already described. If the boxes are of such a size that would make it possible to transport two or more on the same truck, they will be loaded successively or they will be chained together so that when the first one is pulled, the others will also be pulled.

To better understand the nature of the invention, in the attached diagram we make a schematic representation of its utilization which is not limitative in any way and therefore susceptible to the accessory modifications that do not alter the essential characteristics.

Figure 1:
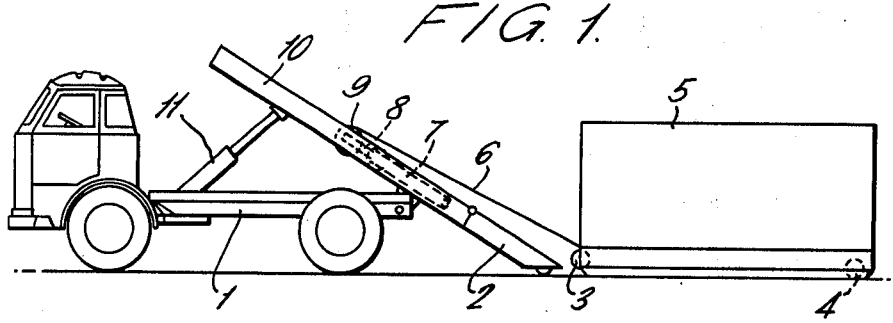
FIG. 1 is an elevational view in which the truck is seen with the frame tilted and the extension inserted as well as the container in position to be loaded.
Figure 2:
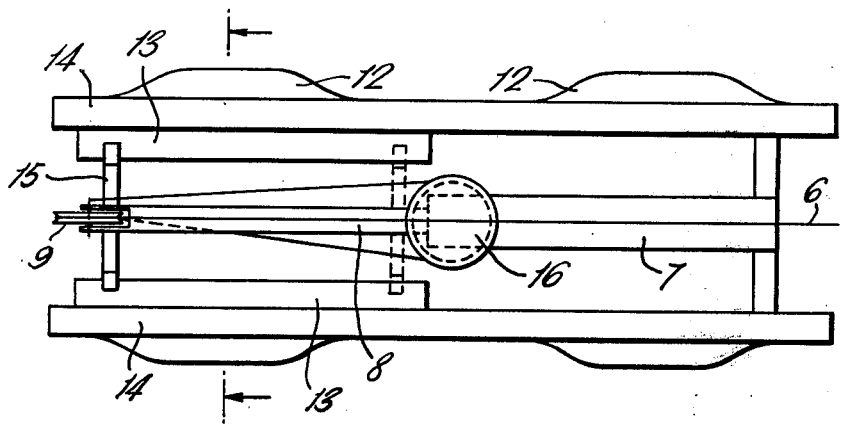
FIG. 2 is a plan view of the tilting frame in which the arrangement of the hydropneumatic cylinder and the set of pulleys for pulling the container is seen.
Figure 3:
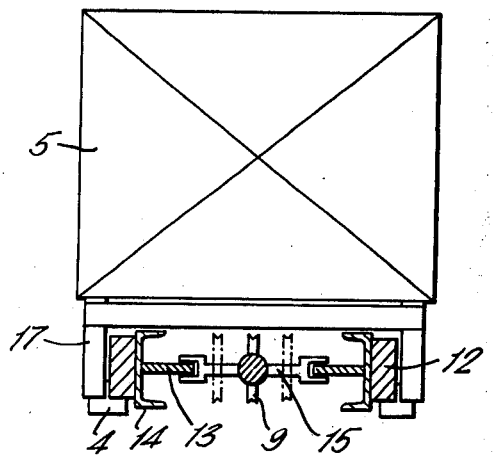
FIG. 3 is a sectional view of the container loaded with a cross section of the frame according to the indication of FIG. 2.
Figure 4:
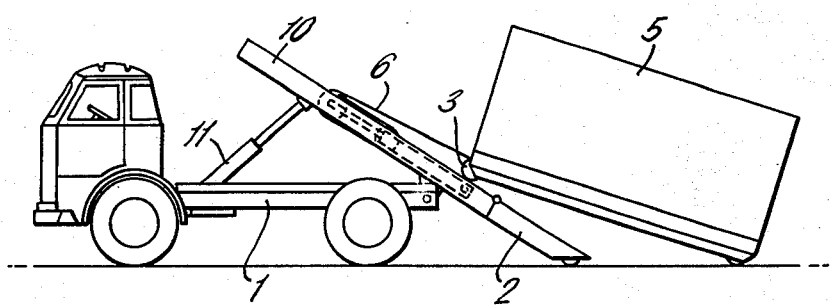
FIG. 4 is a view in which it is seen how the container 3 is arranged to be positioned on the frame.

The tilting frame 10, mounted on the chassis 1 of the truck and integral with same by means of a hinged joint in the rear part, while in the fore-part it is joined to a hydropneumatic cylinder 11 which enables it to tilt, is formed by longitudinal beams 14 which have integral projections 12 on the outside part for placing the container 5 on said beams and which, on the inside part, has guide plates 13 in which the forks are inserted in which the crosshead 15 of the piston 8 ends.

Figure 5:
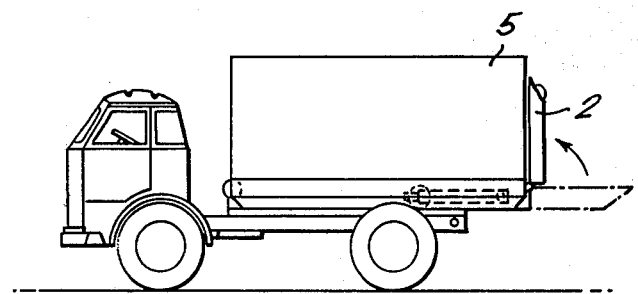
FIG. 5 shows us a representation of the vehicle starting from when the container is already adequately positioned and the tilting frame has descended, with the insertable extension of the frame indicated in two positions.
Figure 6:
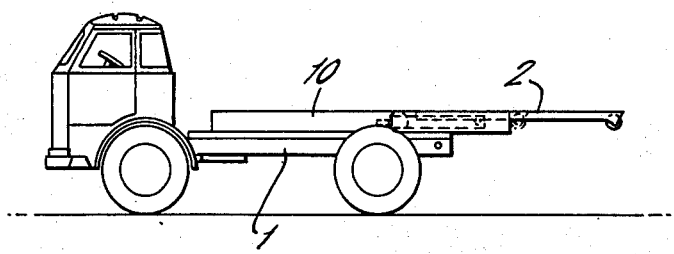
FIG. 6 represents the vehicle in question with the container removed, thus showing how the extension of the frame 10 can also be hidden away in the frame.

At the rear part, the frame 10 has an extension 2 by means of which this frame reaches a dimension such that when lowered it forms a continuous sliding ramp starting from the ground —see FIG. 1—. This extension 2 can be hidden in the frame 10 or else turn on the part where it is joined with the frame to fold up against the container as represented in FIG. 5.

Between the longitudinal beams 14 there is a hydropneumatic cylinder 7, which at its upper end possesses one or several pulleys 16 and whose piston 8 ends at its end in a crosshead 15 ending at both ends in forks which housed on the guide plates 13 make it possible to guide said piston preventing it from wobbling. Next to the crosshead 15 are pulleys 9 that with pulleys 16 form a set through which a haulage line or chain 6 passes, which after passing ends in a hook for anchoring the container. Since the line or chain 6 for hauling passes through a stepped pulley, as it were, by passing through pulleys 9 and 16, when the piston is extended 8, pulley 9 integral with it moves; but a small movement of the piston carries with it a much greater movement of the end of said line or change and as a consequence of the container 5 hooked to same, which by means of its fore-wheels 3 sliding over the longitudinal beams 14 of the frame and the rear wheels 4 over the ground, the container is loaded on the frame 10.

When the container has a certain deviation on the longitudinal beams 14 of the frame, at the moment it is loaded by the hydropneumatic cylinder 7, the flanges 17 guided by the projections 12 place the container in the position suitable for its sliding over the beams of the frame and, therefore, its loading.

With the nature of this invention sufficiently described, as well as its industrial execution, it is only necessary to add that in its whole or constitutive parts it is possible to introduce changes in form material and arrangement providing such alterations do not suppose a substantial variation of same.

I claim:

1. Apparatus for loading and unloading containers onto and from a vehicle comprising:
   a. a tilting frame mounted on said vehicle and having a plurality of longitudinal beams, the outermost beams having at least one outward projection positioned towards the vehicle rear which has at least its end located towards the vehicle rear beveled;
   b. means for tilting said frame;
   c. means for loading a container onto and unloading a container off said frame including:
      i. a single fluid cylinder and piston disposed longitudinally on said frame;
      ii. at least one first pulley mounted on said piston and at least one second pulley mounted on said cylinder;
      iii. first guide means associated with said piston and beams for guiding said piston and said at least one first pulley during extension of the piston, said first guide means comprising guide plates integral with the inside of said beams and fork means connected to said piston and operative to engage said guide plates;

d. second guide means associated with said container and said frame for guiding said container during said extension, said second guide means comprising side flanges associated with said container operative to mate with said beveled projections as said container is rolled onto and slid on said frame; and e. said frame further comprising an extension having beveled portions at the remote end thereof and wheels mounted thereon, said beveled portions and wheels being operative to permit said extension to roll on the surface on which the vehicle stands when said frame is tilted.

2. A vehicle according to claim 1 wherein said extension is pivotally connected to said frame.

3. A vehicle according to claim 1 wherein said extension is slidably mounted on said frame.

* * * * *